United States Patent
Saito et al.

(10) Patent No.: US 12,404,477 B2
(45) Date of Patent: Sep. 2, 2025

(54) COMPOSITION CONTAINING A MODIFIED HYDROXYALKYL CELLULOSE

(71) Applicant: KAO CORPORATION, Tokyo (JP)

(72) Inventors: Takanori Saito, Tokyo (JP); Yoichiro Imori, Wakayama (JP); Satoshi Funasaka, Wakayama (JP)

(73) Assignee: KAO CORPORATION, Tokyo (JP)

( * ) Notice: Subject to any disclaimer, the term of this patent is extended or adjusted under 35 U.S.C. 154(b) by 890 days.

(21) Appl. No.: 17/609,461

(22) PCT Filed: Jun. 10, 2020

(86) PCT No.: PCT/JP2020/022850
§ 371 (c)(1),
(2) Date: Nov. 8, 2021

(87) PCT Pub. No.: WO2020/250931
PCT Pub. Date: Dec. 17, 2020

(65) Prior Publication Data
US 2022/0228087 A1    Jul. 21, 2022

(30) Foreign Application Priority Data

Jun. 11, 2019   (JP) .................................. 2019-109050

(51) Int. Cl.
| | | |
|---|---|---|
| C11D 1/38 | (2006.01) | |
| B08B 3/04 | (2006.01) | |
| C11D 1/62 | (2006.01) | |
| C11D 3/22 | (2006.01) | |
| D06L 1/12 | (2006.01) | |
| D06M 13/46 | (2006.01) | |
| D06M 15/09 | (2006.01) | |

(52) U.S. Cl.
CPC ............... C11D 3/222 (2013.01); C11D 1/62 (2013.01); D06L 1/12 (2013.01); D06M 13/46 (2013.01); D06M 15/09 (2013.01)

(58) Field of Classification Search
CPC .... C11D 1/38; C11D 1/62; C11D 3/22; C11D 3/225; C11D 3/227; B08B 3/04
See application file for complete search history.

(56) References Cited

U.S. PATENT DOCUMENTS

| | | | |
|---|---|---|---|
| 2004/0151681 A1* | 8/2004 | Busk .................. | A61Q 5/12 424/70.13 |
| 2008/0280807 A1* | 11/2008 | Grainger ............ | C11D 1/62 510/522 |
| 2016/0122441 A1 | 5/2016 | Miyoshi et al. | |
| 2020/0369985 A1* | 11/2020 | Saito ................... | C08B 11/145 |
| 2020/0385492 A1* | 12/2020 | Koyama ............ | C11D 3/22 |

FOREIGN PATENT DOCUMENTS

| | | | |
|---|---|---|---|
| CN | 105142731 A | 12/2015 | |
| CN | 111448220 A | 7/2020 | |
| EP | 1690524 * | 8/2006 | ............ A61K 8/73 |
| EP | 1690524 A2 | 8/2006 | |
| JP | 2000178303 A | 6/2000 | |
| JP | 2004519519 A | 7/2004 | |
| JP | 2007145903 A | 6/2007 | |
| JP | 2013529644 A | 7/2013 | |
| JP | 2013536830 A | 9/2013 | |
| JP | 2014169417 A | 9/2014 | |
| JP | 2015168666 A | 9/2015 | |
| JP | 2018076424 A | 5/2018 | |
| JP | 2019073649 A | 5/2019 | |

OTHER PUBLICATIONS

International Search Report issued Aug. 25, 2020 in PCT/JP2020/022850 (with English translation), 7 pages.
Extended European Search Report issued Feb. 27, 2023 in Patent Application No. 20822397.4, 5 pages.

* cited by examiner

*Primary Examiner* — Brian P Mruk
(74) *Attorney, Agent, or Firm* — Element IP, PLC

(57) ABSTRACT

Composition containing a modified hydroxyalkyl cellulose and a cationic surfactant, wherein the modified hydroxyalkyl cellulose has a cationic group and a hydrophobic group of a specific formula, each of which is bound to a group resulting from eliminating a hydrogen atom from a hydroxy group of the hydroxyalkyl cellulose; a degree of substitution of the hydroxyalkyl group in the hydroxyalkyl cellulose is 0.1 or more and 3 or less; and a content of the cationic surfactant is more than 1 part by mass and 1,500 parts by mass or less relative to 1 part by mass of the modified hydroxyalkyl cellulose.

20 Claims, No Drawings

COMPOSITION CONTAINING A MODIFIED HYDROXYALKYL CELLULOSE

FIELD OF THE INVENTION

The present invention relates to a composition.

BACKGROUND OF THE INVENTION

A polysaccharide derivative is used as a blending component of hair cosmetics, such as shampoos, rinses, treatments, and conditioners, and cleaning agent compositions and finishing agent compositions of clothing, and its purpose is various.

JP 2000-178303 A (PTL 1) describes a laundry finishing agent containing a polysaccharide derivative which is substituted with a specified alkyl group, a carboxymethyl group, and a cationic group.

JP 2015-168666 A (PTL 2) describes an aqueous hair cleaning agent containing a specified surfactant, a cationic group-containing cellulose ether, and a specified glyceryl ether.

JP 2013-529644 T (PTL 3) discloses a personal care composition additive including a specified substantive polymer selected from the group consisting of polysaccharides and synthetic polymers containing cationic monomers.

SUMMARY OF THE INVENTION

The present inventors have found that the aforementioned problem is solved by a specified composition.

Specifically, the present invention relates to the following <1>.

<1> A composition containing a modified hydroxyalkyl cellulose (A) and a cationic surfactant (B), wherein the modified hydroxyalkyl cellulose (A) has a cationic group and a hydrophobic group represented by a formula (1), each of which is bound to a group resulting from eliminating a hydrogen atom from a hydroxy group of the hydroxyalkyl cellulose; a degree of substitution of the hydroxyalkyl group in the hydroxyalkyl cellulose is 0.1 or more and 3 or less; and a content of the cationic surfactant (B) is more than 1 part by mass and 1,500 parts by mass or less relative to 1 part by mass of the modified hydroxyalkyl cellulose (A).

$$*-Z-R^1 \quad (1)$$

In the formula (1), Z represents a single bond or a hydrocarbon group having an oxygen atom; $R^1$ represents a hydrocarbon group having 2 or more carbon atoms; and * represents a binding position to a group resulting from eliminating a hydrogen atom from a hydroxy group of the hydroxyalkyl cellulose.

DETAILED DESCRIPTION OF THE INVENTION

As a composition for surface treatment of clothing, etc., there is required a composition capable of improving properties of cleaning a dirt during cleaning. However, conventional compositions for surface treatment have not been able to exhibit a sufficient performance.

The present invention relates to a composition capable of not only improving the properties of cleaning a dirt during cleaning but also reinforcing the function of the cationic surfactant through treatment of an object.

In accordance with the present invention, it is possible to provide a composition capable of not only improving the properties of cleaning a dirt during cleaning but also reinforcing the function which the cationic surfactant has through treatment of an object.

In the following description, the "cleaning performance" means a performance of improving easiness of dirt removal during cleaning.

Composition

The composition of the present invention contains a modified hydroxyalkyl cellulose (A) (hereinafter also referred to as "modified hydroxyalkyl cellulose of the present invention") and a cationic surfactant (B), wherein the modified hydroxyalkyl cellulose (A) has a cationic group and a hydrophobic group represented by a formula (1), each of which is bound to a group resulting from eliminating a hydrogen atom from a hydroxy group of the hydroxyalkyl cellulose; a degree of substitution of the hydroxyalkyl group in the hydroxyalkyl cellulose is 0.1 or more and 3 or less; and a content of the cationic surfactant (B) is more than 1 part by mass and 1,500 parts by mass or less relative to 1 part by mass of the modified hydroxyalkyl cellulose (A).

$$*-Z-R^1 \quad (1)$$

In the formula (1), Z represents a single bond or a hydrocarbon group having an oxygen atom; $R^1$ represents a hydrocarbon group having 2 or more carbon atoms; and * represents a binding position to a group resulting from eliminating a hydrogen atom from a hydroxy group of the hydroxyalkyl cellulose.

The present inventors have found that when a composition, such as a finishing agent for fiber product, which contains the modified hydroxyalkyl cellulose of the present invention and the cationic surfactant in a specified ratio is treated on an object, such as clothing, easiness of dirt removal during cleaning is improved. Although a detailed action mechanism thereof is not elucidated yet, it may be partly estimated as follows.

It may be considered that the modified hydroxyalkyl cellulose (A) that is contained in the composition of the present invention has both the cationic group and the hydrophobic group in the hydroxyalkyl cellulose having a specified degree of substitution of the specified hydroxyalkyl group, and therefore, when adsorbed on the surface of the object, such as clothing, homogeneous and appropriate hydrophilicity is given to the surface. Then, it may be estimated that the modified hydroxyalkyl cellulose (A) undergoes a hydrophobic mutual action, etc. with the cationic surfactant, it efficiently adsorbs on the surface, and therefore, the surface is modified in a state where the dirt is easily removed, whereby the cleaning effect is improved.

Furthermore, in the present invention, it has been clarified that the modified hydroxyalkyl cellulose (A) has an effect for reinforcing the function which the cationic surfactant has. That is, in the case of adding the cationic surfactant for the purpose of improving softness, it has been clarified that the same effect for improving the flexibility is obtained in a smaller addition amount of the cationic surfactant. Although a detailed action mechanism in which such an effect is brought is not elucidated yet, it may be estimated that the aforementioned effect was brought because of an increase of the adsorption amount of the cationic surfactant onto the surface of a treatment article by the modified hydroxyalkyl cellulose (A).

<Modified Hydroxyalkyl Cellulose (A)>

In the modified hydroxyalkyl cellulose (A) of the present invention, each of a cationic group and a hydrophobic group represented by the formula (1) is bound to a group resulting from eliminating a hydrogen atom from a hydroxy group of the hydroxyalkyl cellulose.

$$*-Z-R^1 \quad (1)$$

In the formula (1), Z represents a single bond or a hydrocarbon group having an oxygen atom; $R^1$ represents a hydrocarbon group having 2 or more carbon atoms; and * represents a binding position to a group resulting from eliminating a hydrogen atom from a hydroxy group of the hydroxyalkyl cellulose.

From the viewpoint of improving the cleaning performance, the hydroxyalkyl group which the hydroxyalkyl cellulose has is preferably at least one selected from a hydroxyethyl group and a hydroxypropyl group, more preferably only a hydroxyethyl group or a hydroxypropyl group, and still more preferably only a hydroxyethyl group.

From the viewpoint of improving the cleaning performance, the hydroxyalkyl cellulose is preferably hydroxyethyl cellulose (hereinafter also referred to as "HEC"), hydroxypropyl cellulose, or hydroxybutyl cellulose, more preferably HEC or hydroxypropyl cellulose, and still more preferably HEC.

From the viewpoint of improving the cleaning performance, the modified hydroxyalkyl cellulose of the present invention is preferably modified hydroxyethyl cellulose (hereinafter also referred to as "modified HEC"), modified hydroxypropyl cellulose, or modified hydroxybutyl cellulose, more preferably modified HEC or modified hydroxypropyl cellulose, and still more preferably modified HEC.

A degree of substitution of the hydroxyalkyl group in the hydroxyalkyl cellulose is 0.1 or more, preferably 0.5 or more, more preferably 1 or more, and still more preferably 1.5 or more from the viewpoint of improving the solubility, and it is 3 or less, preferably 2.8 or less, and more preferably 2.6 or less from the viewpoint of improving the cleaning performance.

In the present invention, the degree of substitution of an X group is a molar average degree of substitution of the X group and means a number of substitutions of the X group per mol of the constituent monosaccharide unit of the cellulose. For example, the "degree of substitution of the hydroxyethyl group" means an average molar number of the hydroxyethyl group introduced (bound) per mol of the anhydroglucose unit.

In the case where the hydroxyalkyl cellulose has both a hydroxyethyl group and a hydroxypropyl group, the degree of substitution of the hydroxyalkyl group is a total of the degree of substitution of the hydroxyethyl group and the degree of substitution of the hydroxypropyl group.

(Weight Average Molecular Weight)

In the present invention, a weight average molecular weight of the hydroxyalkyl cellulose is preferably 1,000 or more, more preferably 10,000 or more, still more preferably 100,000 or more, yet still more preferably 130,000 or more, and even yet still more preferably 200,000 or more from the viewpoint of improving the cleaning performance, and it is preferably 3,000,000 or less, more preferably 1,500,000 or less, still more preferably 1,200,000 or less, yet still more preferably 600,000 or less, and even yet still more preferably 400,000 or less from the viewpoint of improving the solubility in the composition.

In the case where the hydroxyalkyl cellulose is procured as a product and provided for use, published values by a manufacturer may be adopted.

(Cationic Group)

In the modified hydroxyalkyl cellulose of the present invention, a cationic group is bound to a group resulting from eliminating a hydrogen atom from a hydroxy group of the aforementioned hydroxyalkyl cellulose. The cationic group as referred to herein means a quaternary ammonium salt, or a tertiary amine capable of being converted into a quaternary ammonium salt upon addition of a proton. In addition, the aforementioned hydroxy group includes a hydroxy group which a hydroxyalkyl group bound to cellulose has and a hydroxy group which a glucose forming a cellulose structure has (a hydroxy group to which the hydroxyalkyl group is not bound).

The cationic group which the modified hydroxyalkyl cellulose has preferably includes a quaternary ammonium cation, and is preferably represented by the following formula (2-1) or formula (2-2). The modified hydroxyalkyl cellulose of the present invention more preferably includes at least a quaternary ammonium cation represented by the formula (2-1).

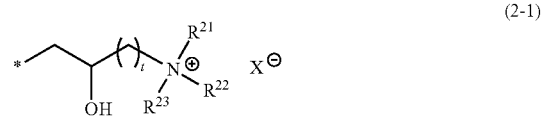

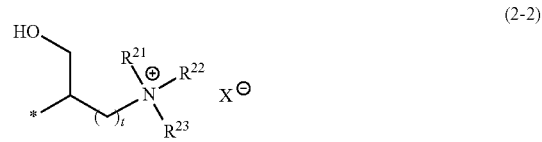

In the formula (2-1) and formula (2-2), $R^{21}$ to $R^{23}$ each independently represent a hydrocarbon group having 1 or more and 4 or less carbon atoms; $X^-$ represents an anion; "t" represents an integer of 0 or more and 3 or less; and * represents a binding position to a group resulting from eliminating a hydrogen atom from a hydroxy group of the hydroxyalkyl cellulose.

$R^{21}$ to $R^{23}$ are each independently preferably a linear or branched hydrocarbon group having 1 or more and 4 or less carbon atoms, and more preferably a methyl group or an ethyl group. Still more preferably, all of $R^{21}$ to $R^{23}$ are a methyl group or an ethyl group, and yet still more preferably, all of $R^{21}$ to $R^{23}$ are a methyl group.

"t" is preferably an integer of 1 or more and 3 or less, more preferably 1 or 2, and still more preferably 1.

$X^-$ is a counter ion of the quaternary ammonium cation, and examples thereof include an alkyl sulfate ion having 1 or more and 3 or less carbon atoms, a sulfate ion, a phosphate ion, a carboxylate ion having 1 or more and 3 or less carbon atoms (e.g., a formate ion, an acetate ion, and a propionate ion), and a halide ion.

Of these, $X^-$ is preferably at least one selected from a methyl sulfate ion, an ethyl sulfate ion, a chloride ion, and a bromide ion from the viewpoint of easiness of production and easiness of raw material availability, and it is more preferably a chloride ion from the viewpoint of solubility in water and chemical stability of the resulting modified hydroxyalkyl cellulose.

$X^-$ may be alone or in combination of two or more thereof.

The group represented by the formula (2-1) or formula (2-2) can be obtained by using an introducing agent of a cationic group (hereinafter also referred to as "cationizing agent"). Examples of the cationizing agent include a glycidyltrialkylammonium chloride and a 3-chloro -2-hydroxy-propyltrialkylammonium chloride. Of these, a glycidyltrialkylammonium chloride is preferred from the viewpoint of easiness of raw material availability and chemical stability and the viewpoint that a salt is not formed as a by-product during reaction with the hydroxyalkyl cellulose.

These cationizing agents can be used alone or in combination of two or more thereof.

From the viewpoint of improving the cleaning performance, a degree of substitution of the cationic group (hereinafter also referred to as "$MS_c$") in the modified hydroxyalkyl cellulose of the present invention is preferably 0.001 or more, more preferably 0.01 or more, and still more preferably 0.015 or more, and preferably 1 or less, more preferably 0.2 or less, still more preferably 0.15 or less, and yet still more preferably 0.1 or less.

The degree of substitution of the cationic group is measured by the method described in the section of Examples.

(Hydrophobic Group)

In the modified hydroxyalkyl cellulose of the present invention, a hydrophobic group represented by the following formula (1) is bound to a group resulting from eliminating a hydrogen atom from a hydroxy group of the hydroxyalkyl cellulose.

$$*-Z-R^1 \quad (1)$$

In the formula (1), Z represents a single bond or a hydrocarbon group having an oxygen atom; $R^1$ represents a hydrocarbon group having 2 or more carbon atoms; and * represents a binding position to a group resulting from eliminating a hydrogen atom from a hydroxy group of the hydroxyalkyl cellulose.

From the viewpoint of improving the cleaning performance, $R^1$ is preferably an alkyl group or an alkenyl group, more preferably an alkyl group, still more preferably a linear or branched alkyl group, and yet still more preferably a linear alkyl group.

From the viewpoint of improving the cleaning performance, the carbon number of $R^1$ is 2 or more, preferably 4 or more, still more preferably 6 or more, yet still more preferably 8 or more, and even yet still more preferably 10 or more, and preferably 24 or less, more preferably 22 or less, still more preferably 18 or less, yet still more preferably 16 or less, even yet still more preferably 14 or less, and even still more preferably 13 or less.

$R^1$ is defined such that the carbon number of the hydrocarbon group becomes maximum. In consequence, the atom in Z bound to $R^1$ in the formula (1) is, for example, an oxygen atom, a carbonate carbon, a carbon atom to which a hydroxy group is bound, or a carbon atom to which a hydroxyalkyl group is bound.

From the viewpoint of improving the cleaning performance, a molar average carbon number of $R^1$ is preferably 4 or more, more preferably 7 or more, and still more preferably 10 or more, and preferably 24 or less, more preferably 18 or less, still more preferably 14 or less, and yet still more preferably 13 or less. The molar average carbon number of $R^1$ is a molar average value of the carbon number distribution $R^1$. The molar average carbon number of $R^1$ can be, for example, measured through gas chromatography (GC).

From the viewpoint of improving the cleaning performance, a proportion of the hydrocarbon group having 9 or more carbon atoms in the hydrocarbon group $R^1$ is preferably 25 mol % or more, more preferably 50 mol % or more, still more preferably 70 mol % or more, and yet still more preferably 90 mol % or more, and it may be 100 mol %, too.

The proportion of the hydrocarbon group having 9 or more carbon atoms can be, for example, measured by adopting GC.

Z represents a single bond or a hydrocarbon group having an oxygen atom. The hydrocarbon group is preferably an alkylene group; a methylene group as a part of the alkylene group may be substituted with an ether bond; a part of the methylene group may be substituted with a carbonyl group (—C(═O)—); and a hydrogen atom as a part of the alkylene group may be substituted with a hydroxy group, an alkyl group, or a hydroxyalkyl group.

In the case where Z is a hydrocarbon group having an oxygen atom (hereinafter also referred to as "hydrocarbon group (Z)"), the hydrocarbon group (Z) preferably contains an epoxy group-derived group, an oxyglycidyl group-derived group, or a group derived from a carboxylic acid (or an anhydride thereof), and from the viewpoint of improving the cleaning performance, the hydrocarbon group (Z) more preferably contains an oxyglycidyl group-derived group.

From the viewpoint that a salt is not formed as a by-product during production of a modified hydroxyalkyl cellulose and that the cleaning performance is improved, the group represented by the formula (1) more preferably contains a group represented by any one of the following formulae (1-1), (1-1'), (1-2), and (1-2') (hereinafter also referred to as "formula (1-1) to formula (1-2')"), still more preferably contains a group represented by at least the formula (1-1) or (1-2), and yet still more preferably contains a group represented by at least the formula (1-1).

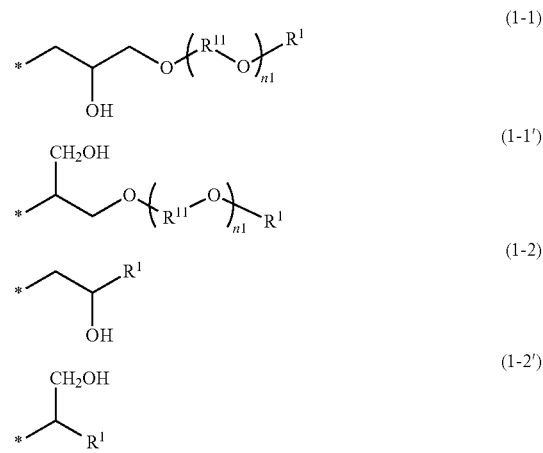

In the formula (1-1) to formula (1-2'), $R^{11}$'s each independently represent an alkylene group having 2 to 4 carbon atoms; $R^1$ is synonymous with $R^1$ in the formula (1); n1 represents an addition molar number of —$R^{11}$—O—, and n1 is an integer of 0 or more and 30 or less; and * represents a binding position to a group resulting from eliminating a hydrogen atom from a hydroxy group of the hydroxyalkyl cellulose.

A preferred embodiment of $R^1$ in the formula (1-1) to formula (1-2') is the same as that of $R^1$ in the formula (1). The group resulting from eliminating $R^1$ from each of the formula (1-1) to formula (1-2') is a preferred embodiment of the hydrocarbon group Z.

$R^{11}$'s are each independently preferably an ethylene group or a propylene group, and more preferably an ethylene group. The carbon number of $R^{11}$ is preferably 2 or more and 3 or less. In the case where a plurality of $R^{11}$'s exist, they may be the same as or different from each other. n1 is preferably 20 or less, more preferably 10 or less, still more preferably 5 or less, yet still more preferably 3 or less, and even yet still more preferably 1 or less, and it may be 0 or more and is more preferably 0.

In the case where the group represented by the formula (1) contains at least one group selected from the group represented by the formula (1-1) and the group represented by the formula (1-1'), an average addition molar number of —$R^{11}$—O— is preferably 20 or less, more preferably 10 or less, still more preferably 5 or less, yet still more preferably 3 or less, and even yet still more preferably 1 or less, and preferably 0 or more from the viewpoint of improving an antibacterial performance.

The formula (1-1) and formula (1-1') are each a group derived from a glycidyl ((poly)alkyleneoxy)hydrocarbyl ether, and Z is a group derived from an oxyglycidyl group or a (poly)alkyleneoxyglycidyl group. The group represented by the formula (1-1) or formula (1-1') is obtained by using, as an introducing agent of the hydrophobic group (hereinafter also referred to as "hydrophobizing agent"), a glycidyl ((poly)alkyleneoxy)hydrocarbyl ether, preferably a glycidyl ((poly)alkyleneoxy)alkyl ether, and more preferably a glycidyl alkyl ether.

The formula (1-2) and formula (1-2') are each a group in which Z is derived from an epoxy group. The group represented by each of the formula (1-2) and formula (1-2') is obtained by using, as the hydrophobizing agent, a terminal-epoxiclized hydrocarbon, and preferably a terminal-epoxiclized alkane.

In the hydrophobic group represented by the formula (1), the total content of the hydrophobic group represented by the formula (1-1), the hydrophobic group represented by the formula (1-1'), the hydrophobic group represented by the formula (1-2), and the hydrophobic group represented by the formula (1-2') is preferably 50 mol % or more, more preferably 80 mol % or more, and still more preferably 90 mol % or more, and 100 mol % or less, and more preferably 100 mol %.

In the present invention, a degree of substitution of the hydrophobic group in the modified hydroxyalkyl cellulose (hereinafter also referred to as "$MS_R$") is preferably 0.0001 or more, more preferably 0.001 or more, still more preferably 0.01 or more, and yet still more preferably 0.015 or more from the viewpoint of improving the cleaning performance, and it is preferably 1 or less, more preferably 0.1 or less, still more preferably 0.05 or less, yet still more preferably 0.04 or less, and even yet still more preferably 0.03 or less from the viewpoint of improving the solubility.

The degree of substitution of the hydrophobic group is measured by the method described in the section of Examples.

In the present invention, in the modified hydroxyalkyl cellulose, a ratio ($MS_R/MS_C$) of the degree of substitution ($MS_R$) of the hydrophobic group to the degree of substitution ($MS_C$) of the cationic group is preferably 0.001 or more, more preferably 0.01 or more, and still more preferably 0.08 or more, and preferably 10 or less, more preferably 5 or less, still more preferably 3 or less, and yet still more preferably 2.5 or less from the viewpoint of improving the cleaning performance.

In the present invention, from the viewpoint of improving the cleaning performance, it is preferred that the hydrophobic group and the cationic group are bound to a group resulting from eliminating a hydrogen atom from a different hydroxy group which the hydroxyalkyl cellulose has. That is, it is preferred that the modified hydroxyalkyl cellulose is not a modified hydroxyalkyl cellulose having the hydrophobic group and the cationic group on one side chain. In other words, it is preferred that the hydrophobic group and the cationic group are bound on a different side chain of the hydroxyalkyl cellulose.

The modified hydroxyalkyl cellulose of the present invention may have an anionic group. In the modified hydroxyalkyl cellulose, a ratio ($MS_A/MS_C$) of a degree of substitution of the anionic group (hereinafter also referred to as "$MS_A$") to a degree of substitution of the cationic group is, for example, 3 or less from the viewpoint of improving the cleaning performance.

$MS_A$ is, for example, less than 0.01 from the viewpoint of improving the cleaning performance.

In the case where the modified hydroxyalkyl cellulose has an anionic group, examples of the anionic group include a carboxymethyl group.

An introduction reaction of the carboxymethyl group (carboxymethylation reaction) is performed by allowing the hydroxyalkyl cellulose to react with a monohalogenated acetate and/or its metal salt in the presence of a basic compound.

In the present invention, the modified hydroxyalkyl cellulose may have a glycerol group as a substituent. A degree of substitution of the glycerol group is, for example, less than 0.5 from the viewpoint of improving the cleaning performance.

The modified hydroxyalkyl cellulose having a glycerol group is, for example, obtained by allowing a glycerolizing agent to act in a production process of the modified hydroxyalkyl cellulose as mentioned later. Examples of the glycerolizing agent include glycidol, 3-chloro-1,2-prop anediol, 3-bromo-1,2-propanediol, glycerin, and glycerin carbonate.

<Production Method of Modified Hydroxyalkyl Cellulose>

It is preferred that the modified hydroxyalkyl cellulose of the present invention is obtained by allowing the hydroxyalkyl cellulose to react with a cationizing agent and a hydrophobizing agent, thereby introducing a cationic group and a hydrophobic group.

All of the introduction reaction of the cationic group (hereinafter also referred to as "cationization reaction") and the introduction reaction of the hydrophobic group (hereinafter also referred as "hydrophobization reaction") into the hydroxyalkyl cellulose are preferably performed in the coexistence of a basic compound. From the viewpoint of reaction rate in the introduction reactions, the basic compound is preferably an alkali metal hydroxide, and more preferably sodium hydroxide or potassium hydroxide.

From the viewpoint of reactivity, the aforementioned reaction may be performed in the presence of a non-aqueous solvent. Examples of the non-aqueous solvent include polar solvents, such as 2-propanol.

After the reaction, the basic compound can be neutralized with an acid. Examples of the acid include inorganic acids, such as phosphoric acid, and organic acids, such as acetic acid.

The resulting modified hydroxyalkyl cellulose may be purified through filtration, washing, etc. as the need arises.

<Cationic Surfactant (B)>

The composition of the present invention contains a cationic surfactant.

Although the cationic surfactant is not particularly limited, examples thereof include a cationic surfactant (B1) that is a quaternary ammonium salt and a cationic surfactant (B2) that is a tertiary amine compound or a salt thereof.

(Cationic Surfactant (B1) that is Quaternary Ammonium Salt)

Examples of the cationic surfactant (B1) that is a quaternary ammonium salt (hereinafter also referred to as "cationic surfactant (B1)") include a compound represented by the following formula (B1-1).

(B1-1)

In the formula (B1-1), $R^{b1}$ is a hydrocarbon group having a total carbon number of 12 or more and 24 or less, which may be divided by an ester group and/or an amide group; $R^{b2}$ and $R^{b3}$ are each independently a hydrocarbon group having a total carbon number of 12 or more and 24 or less, which may be divided by an ester group and/or an amide group, a hydroxyalkyl group having 1 or more and 3 or less carbon atoms, or an alkyl group having 1 or more and 3 or less carbon atoms; $R^{b4}$ is a hydrogen atom or a hydrocarbon group having 1 or more and 8 or less carbon atoms; and $X^-$ is an anionic group.

In the formula (B1-1), from the viewpoint of reinforcing the effect of the cationic surfactant (B) through a combination with the modified hydroxyalkyl cellulose (A), the total carbon number of $R^{b1}$ is preferably 12 or more and 22 or less, and more preferably 12 or more and 20 or less, and the foregoing hydrocarbon group is a saturated or unsaturated hydrocarbon group which may be divided by an ester group and/or an amide group.

In the formula (B1-1), in the case where $R^{b2}$ and $R^{b3}$ are each a hydroxyalkyl group having 1 or more and 3 or less carbon atoms, from the viewpoint of reinforcing the effect of the cationic surfactant (B) through a combination with the modified hydroxyalkyl cellulose (A), the hydroxyalkyl group is preferably a hydroxyethyl group. In the case where $R^{b2}$ and $R^{b3}$ are each an alkyl group having 1 or more and 3 or less carbon atoms, from the same viewpoint, the alkyl group is preferably a methyl group or an ethyl group, and more preferably a methyl group. In the case where $R^{b2}$ and $R^{b3}$ are each a hydrocarbon group having a total carbon number of 12 or more and 24 or less, which may be divided by an ester group and/or an amide group, from the same viewpoint, the total carbon number is preferably 12 or more and 22 or less, and more preferably 12 or more and 20 or less, and the foregoing hydrocarbon group is a saturated or unsaturated hydrocarbon group which may be divided by an ester group and/or an amide group.

In the formula (B1-1), $R^{b4}$ is a hydrogen atom or a hydrocarbon group having 1 or more and 8 or less carbon atoms, and from the viewpoint of reinforcing the effect of the cationic surfactant (B) through a combination with the modified hydroxyalkyl cellulose (A), the foregoing hydrocarbon group is preferably a hydrocarbon group having 1 or more and 3 or less carbon atoms, more preferably an alkyl group having 1 or more and 3 or less carbon atoms, still more preferably a methyl group or an ethyl group, and yet still more preferably a methyl group.

$X^-$ is a counter ion of the quaternary ammonium cation, and examples thereof include a halogen ion, a sulfate ion, a fatty acid ion having 1 or more and 12 or less carbon atoms, or an alkyl sulfate ion having 1 or more and 3 or less carbon atoms.

In the case where the composition of the present invention is used as a finishing agent for fiber product, from the standpoint that the treated fiber product is able to more enjoy an effect for maintaining the water absorbency, the hydrocarbon group having a total carbon number of 12 or more and 24 or less, which may be divided by an ester group and/or an amide group, in $R^{b1}$, $R^{b2}$, and $R^{b3}$ is preferably a hydrocarbon group including an unsaturated hydrocarbon group, and more preferably a hydrocarbon group including an unsaturated hydrocarbon group and having a total carbon number of 12 or more and 24 or less, which is divided by an ester group.

The compound represented by the formula (B1-1) can be produced by selecting a formulation of a hydrocarbon group of a fatty acid or a fatty acid lower alkyl ester (the carbon number of the alkyl group is 1 or more and 3 or less) and subjecting a raw material fatty acid or fatty acid lower alkyl ester (the carbon number of the alkyl group is 1 or more and 3 or less) having a specified molar number so as to have such a formulation and an alkanolamine corresponding thereto to a dehydration esterification reaction or a transesterification reaction, followed by performing a quaternization reaction with an alkylating agent or a neutralization reaction with an acid agent.

The carbon number of the aforementioned fatty acid is preferably 16 or more and 22 or less, and more preferably 16 or more and 18 or less.

Specific examples of the fatty acid include at least one selected from saturated fatty acids, such as stearic acid and palmitic acid; unsaturated fatty acids, such as oleic acid, elaidic acid, linoleic acid, and linolenic acid; fatty acids derived from a vegetable oil, such as palm oil fatty acid, sunflower oil fatty acid, soybean oil fatty acid, rapeseed oil fatty acid, safflower oil fatty acid, cottonseed oil fatty acid, maize oil fatty acid, olive oil fatty acid, and hydrogenated palm oil fatty acid; and fatty acids derived from an animal oil, such as beef tallow fatty aid and hydrogenated beef tallow fatty acid. Of these, saturated fatty acids, unsaturated fatty acids, and fatty acids derived from a vegetable oil are preferred, fatty acids derived from a vegetable oil are more preferred, and a fatty acid derived from a palm oil is still more preferred.

Examples of the aforementioned alkanolamine include a dialkyl monoalkanolamine (preferably dimethyl monoethanolamine or dimethyl monopropanolamine), a monoalkyl dialkanolamine (preferably methyl diethanolamine or methyl dipropanolamine), and a trialkanolamine (preferably triethanolamine or tripropanolamine), with a trialkanolamine being preferred.

In the esterification reaction or transesterification reaction, a molar ratio between the fatty acid or fatty acid lower alkyl ester and the hydroxy group of the alkanolamine is preferably 0.3:1.0 or more, and more preferably 0.5:1.0 or more, and preferably 1.2:1.0 or less, and more preferably 1.0:1.0 or less in terms of [(fatty acid or fatty acid lower alkyl ester):(hydroxy group of alkanolamine)].

Examples of the alkylating agent include a chalky' sulfate (the carbon number of the alkyl group is 1 or more and 3 or less) and an alkyl halide (the carbon number of the alkyl group is 1 or more and 3 or less). Examples of the acid agent include an inorganic acid and an organic acid. Examples of the inorganic acid include hydrochloric acid and sulfuric acid. Examples of the organic acid include a carboxylic acid having 2 or more and 6 or less carbon atoms, for example, lactic acid, glycolic acid, and citric acid. In addition, examples of other organic acid include an alkyl sulfate having 1 or more and 3 or less carbon atoms.

Although the quaternization reaction with an alkylating agent can be performed in the presence of a solvent (for example, ethanol), it is more preferably performed through synthesis in the absence of a solvent from the viewpoint of suppressing the formation of impurities. In addition, the neutralization reaction with an acid agent can be performed in the presence of water or in the presence of a solvent (for example, ethanol).

In the present invention, from the viewpoint of more reinforcing the effect of the cationic surfactant (B) owing to the modified hydroxyalkyl cellulose (A), the cationic surfactant (B) is preferably the cationic surfactant (B1), more preferably a cationic surfactant wherein in the formula (B1-1), $R^{b1}$ is a hydrocarbon group having a total carbon number of 12 or more and 24 or less, which may be divided by an ester group, and still more preferably a cationic surfactant wherein in the formula (B1-1), $R^{b1}$ is an unsaturated hydrocarbon group having a total carbon number of 12 or more and 24 or less, which may be divided by an ester group. A cationic surfactant produced by subjecting a fatty acid or a fatty acid lower alkyl ester and an alkanolamine to a dehydration esterification reaction or a transesterification reaction, followed by further performing a quaternization reaction with an alkylating agent or a neutralization reaction with an acid agent is yet still more preferred; and a cationic surfactant resulting from quaternization of an N,N-clialkanoyloxyethyl-N-hydroxyethylamine which is obtained by allowing an unsaturated fatty acid having 10 or more and 22 or less carbon atoms or a lower alkyl ester thereof to react with triethanolamine, with a dialkyl sulfate (the carbon number of the alkyl group is 1 or more and 3 or less) is even yet still more preferred.

The cationic surfactant (B) may be used alone or may be used in combination of two or more thereof.

<Formulation of Composition>

The composition of the present invention contains at least the modified hydroxyalkyl cellulose (A) and the cationic surfactant (B).

In the composition of the present invention, the content of the cationic surfactant is more than 1 part by mass, preferably 1.5 parts by mass or more, and more preferably 1.7 parts by mass or more relative to 1 part by mass of the modified hydroxyalkyl cellulose from the viewpoint of reinforcing the effect of the cationic surfactant (B) through a combination with the modified hydroxyalkyl cellulose (A), and it is 1,500 parts by mass or less, preferably 1,000 parts by mass or less, more preferably 100 parts by mass or less, still more preferably 50 parts by mass or less, and yet still more preferably 20 parts by mass or less, 15 parts by mass or less, 5 parts by mass or less, or 3 parts by mass or less from the viewpoint of improving the cleaning performance.

In the composition of the present invention, from the viewpoint of improving the cleaning performance, the content of the modified hydroxyalkyl cellulose (A) is preferably 0.00001% by mass or more, more preferably 0.0001% by mass or more, still more preferably 0.001% by mass or more, yet still more preferably 0.01% by mass or more, and even yet still more preferably 0.1% by mass or more, and preferably 10% by mass or less, more preferably 5% by mass or less, and still more preferably 3% by mass or less.

In the composition of the present invention, from the viewpoint of exhibiting the effect to be brought by the cationic surfactant, the content of the cationic surfactant (B) is preferably 0.001% by mass or more, more preferably 0.01% by mass or more, still more preferably 0.1% by mass or more, yet still more preferably 0.8% by mass or more, and even yet still more preferably 1.8% by mass or more, and preferably 50% by mass or less, more preferably 30% by mass or less, still more preferably 20% by mass or less, yet still more preferably 10% by mass or less, and even yet still more preferably 6% by mass or less.

The composition of the present invention may contain, in addition to the aforementioned components, other component as the need arises. In the case of using the composition of the present invention as a finishing agent for fiber product, the composition may contain water, an organic solvent, a fragrance, a pH controlling agent, and the like, and from the viewpoint of stability, it preferably contains water.

<Application>

The composition of the present invention is preferably used as a surface treatment agent, and by treating the surface of an object with the composition of the present invention, the properties of cleaning a dirt from the object during cleaning can be improved.

The object is not particularly limited, and it may be a hard surface, such as glass, tile, wood, flooring, cushioning floor, wall cloth, enamelware, natural stone, e.g., marble and granite, artificial marble, vinyl floor tile, steel, ceramics, pottery, and plastics; a soft surface, such as fiber product and sponge; and a human or animal skin, hair, nail, tooth, etc. without being particularly limited.

Of these, hairs and fiber products are preferred, and fiber products are more preferred from the viewpoint that the effect to be brought by the cationic surfactant and the cleaning effect are effectively exhibited.

The composition of the present invention is more preferably used as a finishing agent for fiber product.

The finishing agent for fiber product refers to a composition which includes a softening agent for fiber product, a finishing agent for recovery from shape loss of the fiber product, a finishing agent for perfuming the fiber product, a finishing agent for improving the cleaning performance of fiber product, and so on and which is used for fiber product in order to change characteristics which the fiber product has after cleaning (for example, improvement of softness, recovery of shape loss, perfuming, and cleaning performance).

In the case where the composition of the present invention is, for example, a finishing agent for fiber product, it is preferred that the composition of the present invention is diluted with a solvent, such as water, during use. The composition of the present invention may be diluted during use dependent upon its application.

In the present invention, the concentration of the modified hydroxyalkyl cellulose during treating an object, such as clothing, is preferably 0.01 mg/L or more, more preferably 0.1 mg/L or more, still more preferably 1 mg/L or more, yet still more preferably 3 mg/L or more, and even yet still more preferably 5 mg/L or more from the viewpoint of improving the cleaning performance, and it is preferably 10,000 mg/L or less, more preferably 1,000 mg/L or less, still more preferably 100 mg/L or less, and yet still more preferably 30 mg/L or less from the viewpoint of economy.

The present invention further discloses the following [1] to [23].

[1] A composition comprising a modified hydroxyalkyl cellulose (A) and a cationic surfactant (B), wherein the modified hydroxyalkyl cellulose (A) has a cationic group and a hydrophobic group represented by a formula (1), each of which is bound to a group resulting from eliminating a hydrogen atom from a hydroxy group of the hydroxyalkyl cellulose; a degree of substitution of the hydroxyalkyl group in the hydroxyalkyl cellulose is 0.1 or more and 3 or less; and a content of the cationic surfactant (B) is more than 1 part by mass and 1,500 parts by mass or less relative to 1 part by mass of the modified hydroxyalkyl cellulose (A).

In the formula (1), Z represents a single bond or a hydrocarbon group having an oxygen atom; $R^1$ represents a hydrocarbon group having 2 or more carbon atoms; and * represents a binding position to a group resulting from eliminating a hydrogen atom from a hydroxy group of the hydroxyalkyl cellulose.

- [2] The composition according to [1], wherein in the formula (1), the carbon number of $R^1$ is preferably 4 or more, more preferably 6 or more, still more preferably 8 or more, and yet still more preferably 10 or more, and preferably 24 or less, more preferably 22 or less, still more preferably 18 or less, yet still more preferably 16 or less, even yet still more preferably 14 or less, and even still more preferably 13 or less.
- [3] The composition according to [1] or [2], wherein in the formula (1), $R^1$ is preferably an alkyl group or an alkenyl group, more preferably an alkyl group, still more preferably a linear or branched alkyl group, and yet still more preferably a linear alkyl group.
- [4] The composition according to any of [1] to [3], wherein a degree of substitution of the cationic group in the modified hydroxyalkyl cellulose (A) is preferably 0.001 or more, more preferably 0.01 or more, and still more preferably 0.015 or more, and preferably 1 or less, more preferably 0.2 or less, still more preferably 0.15 or less, and yet still more preferably 0.1 or less.
- [5] The composition according to any of [1] to [4], wherein a degree of substitution of the hydrophobic group represented by the formula (1) in the modified hydroxyalkyl cellulose (A) is preferably 0.0001 or more, more preferably 0.001 or more, still more preferably 0.01 or more, and yet still more preferably 0.015 or more, and preferably 1 or less, more preferably 0.1 or less, still more preferably 0.05 or less, yet still more preferably 0.04 or less, and even yet still more preferably 0.03 or less.
- [6] The composition according to any of [1] to [5], wherein the hydroxyalkyl cellulose is preferably selected from hydroxyethyl cellulose, hydroxypropyl cellulose, and hydroxybutyl cellulose, more preferably selected from hydroxyethyl cellulose and hydroxypropyl cellulose, and still more preferably hydroxyethyl cellulose.
- [7] The composition according to any of [1] to [6], wherein a degree of substitution of the hydroxyalkyl group in the hydroxyalkyl cellulose is preferably 0.5 or more, more preferably 1 or more, and still more preferably 1.5 or more, and preferably 2.8 or less, and more preferably 2.6 or less.
- [8] The composition according to any of [1] to [7], wherein a weight average molecular weight of the hydroxyalkyl cellulose is preferably 1,000 or more, more preferably 10,000 or more, still more preferably 100,000 or more, yet still more preferably 130,000 or more, and even yet still more preferably 200,000 or more, and preferably 3,000,000 or less, more preferably 1,500,000 or less, still more preferably 1,200,000 or less, yet still more preferably 600,000 or less, and even yet still more preferably 400,000 or less.
- [9] The composition according to any of [1] to [8], wherein the hydrophobic group represented by the formula (1) includes any hydrophobic groups represented by following formula (1-1), formula (1-1'), formula (1-2), and formula (1-2').

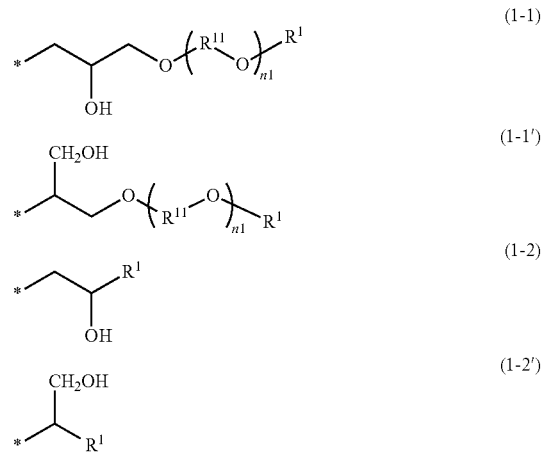

In the formula (1-1) to formula (1-2'), $R^{11}$'s each independently represent an alkylene group having 2 to 4 carbon atoms; $R^1$ is synonymous with $R^1$ in the formula (1); n1 represents an addition molar number of $-R^{11}-O-$, and n1 is an integer of 0 or more and 30 or less; and * represents a binding position to a group resulting from eliminating a hydrogen atom from a hydroxy group of the hydroxyalkyl cellulose.

- [10] The composition according to any of [1] to [9], wherein the cationic group which the modified hydroxyalkyl cellulose (A) has includes a quaternary ammonium cation.
- [11] The composition according to any of [1] to [10], wherein the cationic group which the modified hydroxyalkyl cellulose (A) has is represented by the formula (2-1) or (2-2).

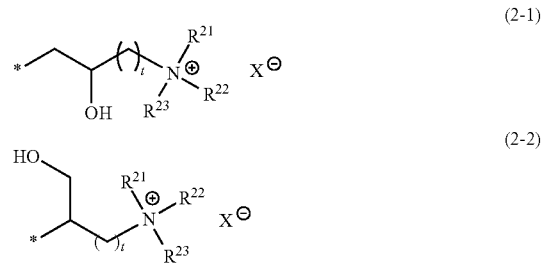

In the formula (2-1) and formula (2-2), $R^{21}$ to $R^{23}$ each independently represent a hydrocarbon group having 1 or more and 4 or less carbon atoms; $X^-$ represents an anion; "t" represents an integer of 0 or more and 3 or less; and * represents a binding position to a group resulting from eliminating a hydrogen atom from a hydroxy group of the hydroxyalkyl cellulose.

- [12] The composition according to any of [1] to [11], wherein in the modified hydroxyalkyl cellulose (A), a ratio ($MS_R/MS_C$) of a degree of substitution ($MS_R$) of the hydrophobic group to a degree of substitution ($MS_C$) of the cationic group is preferably 0.001 or more, more preferably 0.01 or more, and still more preferably 0.08 or more, and preferably 10 or less, more preferably 5 or less, still more preferably 3 or less, and yet still more preferably 2.5 or less.

[13] The composition according to any of [1] to [12], wherein the content of the cationic surfactant is preferably 1.5 parts by mass or more, and more preferably 1.7 parts by mass or more, and preferably 1,000 parts by mass or less, more preferably 100 parts by mass or less, still more preferably 50 parts by mass or less, and yet still more preferably 20 parts by mass or less, 15 parts by mass or less, 5 parts by mass or less, or 3 parts by mass or less relative to 1 part by mass of the modified hydroxyalkyl cellulose (A).

[14] The composition according to any of [1] to [13], wherein the content of the modified hydroxyalkyl cellulose (A) is preferably 0.00001% by mass or more, more preferably 0.0001% by mass or more, still more preferably 0.001% by mass or more, yet still more preferably 0.01% by mass or more, and even yet still more preferably 0.1% by mass or more, and preferably 10% by mass or less, more preferably 5% by mass or less, and still more preferably 3% by mass or less.

[15] The composition according to any of [1] to [14], wherein the content of the cationic surfactant (B) is preferably 0.001% by mass or more, more preferably 0.01% by mass or more, still more preferably 0.1% by mass or more, yet still more preferably 0.8% by mass or more, and even yet still more preferably 1.8% by mass or more, and preferably 50% by mass or less, more preferably 30% by mass or less, still more preferably 20% by mass or less, yet still more preferably 10% by mass or less, and even yet still more preferably 6% by mass or less.

[16] The composition according to any of [1] to [15], wherein the cationic surfactant (B) is a quaternary ammonium salt.

[17] The composition according to any of [1] to [16], wherein the cationic surfactant is a cationic surfactant resulting from quaternization of an N,N-clialkanoyloxyethyl-N-hydroxyethylamine which is obtained by allowing an unsaturated fatty acid having 10 or more and 22 or less carbon atoms or a lower alkyl ester thereof to react with triethanolamine, with a dialkyl sulfate (the carbon number of the alkyl group is 1 or more and 3 or less).

[18] Use of the composition according to any of [1] to [17] as a surface treatment agent.

[19] Use of the composition according to any of [1] to [17] as a finishing agent for fiber product.

[20] The use according to [19], wherein the concentration of the modified hydroxyalkyl cellulose in an aqueous solution during treating a fiber product is preferably 0.01 mg/L or more, more preferably 0.1 mg/L or more, still more preferably 1 mg/L or more, yet still more preferably 3 mg/L or more, and even yet still more preferably 5 mg/L or more, and preferably 10,000 mg/L or less, more preferably 1,000 mg/L or less, still more preferably 100 mg/L or less, and yet still more preferably 30 mg/L or less.

[21] A surface treatment method comprising bringing the composition according to any of [1] to [17] into contact with an article.

[22] A surface treatment method of fiber product, including bringing the composition according to any of [1] to [17] into contact with a fiber product.

[23] The surface treatment method according to [22], wherein the concentration of the modified hydroxyalkyl cellulose in an aqueous solution during bringing into contact with a fiber product is preferably 0.01 mg/L or more, more preferably 0.1 mg/L or more, still more preferably 1 mg/L or more, yet still more preferably 3 mg/L or more, and even yet still more preferably 5 mg/L or more, and preferably 10,000 mg/L or less, more preferably 1,000 mg/L or less, still more preferably 100 mg/L or less, and yet still more preferably 30 mg/L or less.

EXAMPLES

The measuring methods adopted in Examples and Comparative Examples are as follows.

Measurement of Degree of Substitution (Molar Average Degree of Substitution (MS))

Pretreatment 1 g of a powdery modified hydroxyalkyl cellulose was dissolved in 100 g of deionized water, and then, an aqueous solution was charged in a dialytic membrane (Spectra/Por, molecular weight cutoff: 1,000) and subjected to dialysis for 2 days. The resulting aqueous solution was freeze-dried with a freeze dryer (FDU1100, manufactured by EYELA), to obtain a purified modified hydroxyalkyl cellulose.

<Calculation of Mass of Cationic Group by Kjeldahl Method>

200 mg of the purified modified hydroxyalkyl cellulose was accurately metered, to which were then added 10 mL of sulfuric acid and one tablet of a Kjeldahl tablet (manufactured by Merck), followed by undergoing thermal decomposition with a Kjeldahl decomposition apparatus (K-432, manufactured by BUCHI). After completion of decomposition, 30 mL of deionized water was added to the sample, and the nitrogen content (% by mass) of the sample was determined using an automatic Kjeldahl distillation apparatus (K-370, manufactured by BUCHI), thereby calculating the mass of the cationic group.

<Calculation of Mass of Hydrophobic Group (Hydrocarbon Group) by Zeisel Method>

A calculation method of the mass of an alkyl group that is the hydrocarbon group is hereunder described while referring to the case of Example 1 (using lauryl glycidyl ether as an introducing agent of the hydrocarbon group) as an example.

200 mg of the purified cellulose derivative and 220 mg of adipic acid were accurately metered in a 10-mL vial (Mighty Vial No. 3), to which were then added 3 mL of an internal standard solution (tetradecane/o-xylene=1/25 (v/v)) and 3 mL of hydroioclic acid, followed by sealing up. In addition, a sample for calibration curve having 2, 4, or 9 mg of 1-iodododecane added thereto in place of the cellulose derivative was prepared. Each of the samples was heated under a condition at 160° C. for 2 hours by using a block heater (Reacti-Therm III Heating/Stirring module, manufactured by PIERCE) while stirring with a stirring chip. The sample was allowed to stand for cooling, and then, an upper layer (o-xylene layer) was recovered and analyzed for the amount of 1-iodododecane through gas chromatography (GC-2010 plus, manufactured by Shimadzu Corporation).

Condition for GC Analysis

Column: Agilent HP-1 (length: 30 m, liquid phase membrane thickness: 0.25 μL, inner diameter: 32 mm)

Split ratio: 20

Column temperature: 100° C. (2 min)→10° C./min→300° C. (15 min)
Injector temperature: 300° C.
Detector: FID
Detector temperature: 330° C.
Amount of implantation: 2 μL
The mass of the alkyl group in the sample was determined from the detection amount of 1-iodododecane obtained through GC.

<Measurement of Mass of Hydroxyalkyl Group>

The mass of the hydroxyalkyl group was measured in the same manner as in the aforementioned measurement of the mass of the alkyl group by quantitatively determining the hydroxyalkyl group-derived alkyl iodide.

<Calculation of Degree of Substitution (Molar Average Degree of Substitution) of Each of Cationic Group, Hydrophobic Group, and Hydroxyalkyl Group>

From the masses of the aforementioned cationic group and the hydrophobic group (hydrocarbon group) and the masses of all of the samples, the mass of the HEC structure was calculated and converted into a substance amount (mol), respectively, thereby calculating the degree of substitution ($MS_C$) of the cationic group and the degree of substitution ($MS_R$) of the alkyl group that is the hydrophobic group.

The raw materials used for synthesis of the modified hydroxyalkyl cellulose are as follows.

Natrosol 250 GR:HEC (weight average molecular weight: 300,000, degree of substitution of hydroxyethyl group: 2.5, manufactured by Ashland)
Natrosol 250 HR:HEC (weight average molecular weight: 1,000,000, degree of substitution of hydroxyethyl group: 2.5, manufactured by Ashland)
Natrosol 250 JR:HEC (weight average molecular weight: 150,000, degree of substitution of hydroxyethyl group: 2.5, manufactured by Ashland)
IPA: 2-Propanol
LA-EP: Lauryl glycidyl ether, manufactured by Yokkaichi Chemical Company
CE-EP: Cetyl glycidyl ether, manufactured by Yokkaichi Chemical Company
1,2-Epoxytetradecane, manufacture by FUJIFILM Wako Pure Chemical Corporation
GMAC: Glycidyl trimethylammonium chloride, "SY-GTA80", manufactured by Sakamoto Yakuhin Kogyo Co., Ltd.

Synthesis Example 1: Synthesis of Modified Hydroxyalkyl Cellulose (M-HEC-1)

90 g of Natrosol 250 GR as the hydroxyalkyl cellulose was charged in a one-liter separable flask, and nitrogen was allowed to pass therethrough. 77.2 g of deionized water and 414.5 g of IPA were added and stirred for 5 minutes, and then, 10.9 g of a 48% by mass sodium hydroxide aqueous solution was added, followed by stirring for an additional 15 minutes. Subsequently, 4.5 g of LA-EP as a hydrophobizing agent was added, to undergo a hydrophobization reaction at 80° C. for 5 hours. Furthermore, 10.3 g of GMAC was added as a cationizing agent, to undergo a cationization reaction at 50° C. for 1.5 hours. Thereafter, 10.9 g of a 90% by mass acetic acid aqueous solution was added, and stirring was performed for 30 minutes, to undergo a neutralization reaction.

The resulting suspension liquid was transferred equally into two 500-mL centrifuge tubes and centrifuged at 1,500 G for 40 seconds by using a high-speed cooling centrifuge (CR21G III, manufactured by Hitachi Koki Co., Ltd.). A supernatant was removed through decantation, and an 85% by mass IPA aqueous solution in the same amount as that of the removed supernatant was added, to undergo redispersion. Again, the operation of centrifugation and redispersion was repeated, and after performing the third centrifugation, a precipitate was taken out. The resulting precipitate was vacuum-dried at 80° C. for 12 hours or more by using a vacuum dryer (VR-420, manufactured by Advantec Co., Ltd.) and then crushed with an extreme mill (MX-1200XTM, manufactured by Waring), to obtain a powdery modified hydroxyethyl cellulose (M-HEC-1).

The resulting M-HEC-1 had a degree of substitution ($MS_C$) of the cationic group of 0.085 and a degree of substitution ($MS_R$) of the hydrophobic group (hydrocarbon group) of 0.02.

Synthesis Examples 2 to 10

The same operations as those in Synthesis Example 1 were performed, except for changing the used hydroxyalkyl cellulose, hydrophobizing agent, and cationizing agent as shown in Table 1. There were thus obtained powdery modified hydroxyethyl celluloses (M-HEC-2 to M-HEC-10).

Synthesis Example 11

A powdery modified hydroxyethyl cellulose (M-HEC-11) was obtained in the same manner as in Synthesis Example 6, except for using 12.8 g of 1,2-epoxytetradecane in place of 3.4 g of LA-EP.

Synthesis Example 12

A powdery modified hydroxyethyl cellulose (M-HEC-12) was obtained in the same manner as in Synthesis Example 1, except for using 7.2 g of cetyl glycidyl ether in place of 4.5 g of LA-EP.

TABLE 1

| Synthesis Example | Modified hydroxyalkyl cellulose | Hydroxyalkyl cellulose Kind | Mw | Hydrophobizing agent Kind | (g) | Cationizing agent GMAC (g) | $MS_R$ | $MS_C$ |
|---|---|---|---|---|---|---|---|---|
| 1 | M-HEC-1 | Natrosol 250 GR | 300,000 | LA-EP | 4.5 | 10.3 | 0.02 | 0.085 |
| 2 | M-HEC-2 | Natrosol 250 HR | 1,000,000 | LA-EP | 3.7 | 12.3 | 0.02 | 0.085 |
| 3 | M-HEC-3 | Natrosol 250 JR | 150,000 | LA-EP | 3.5 | 14.1 | 0.02 | 0.085 |
| 4 | M-HEC-4 | Natrosol 250 GR | 300,000 | LA-EP | 2.0 | 13.4 | 0.01 | 0.085 |
| 5 | M-HEC-5 | Natrosol 250 GR | 300,000 | LA-EP | 8.9 | 12.3 | 0.04 | 0.085 |
| 6 | M-HEC-6 | Natrosol 250 GR | 300,000 | LA-EP | 3.4 | 3.0 | 0.02 | 0.02 |
| 7 | M-HEC-7 | Natrosol 250 GR | 300,000 | LA-EP | 3.2 | 18.4 | 0.02 | 0.14 |
| 8 | M-HEC-8 | Natrosol 250 GR | 300,000 | LA-EP | 2.1 | 2.6 | 0.01 | 0.02 |
| 9 | M-HEC-9 | Natrosol 250 GR | 300,000 | LA-EP | 8.5 | 4.8 | 0.04 | 0.02 |

TABLE 1-continued

| Synthesis Example | Modified hydroxyalkyl cellulose | Hydroxyalkyl cellulose Kind | Mw | Hydrophobizing agent Kind | (g) | Cationizing agent GMAC (g) | $MS_R$ | $MS_C$ |
|---|---|---|---|---|---|---|---|---|
| 10 | M-HEC-10 | Natrosol 250 GR | 300,000 | LA-EP | 7.8 | 18.3 | 0.04 | 0.14 |
| 11 | M-HEC-11 | Natrosol 250 GR | 300,000 | 1,2-Epoxytetradecane | 12.8 | 3.0 | 0.02 | 0.02 |
| 12 | M-HEC-12 | Natrosol 250 GR | 300,000 | CE-EP | 7.2 | 10.3 | 0.02 | 0.085 |

In M-HEC-1 to M-HEC-11, the molar average carbon number of $R^1$ of the hydrophobic group is 12, and the proportion of the hydrocarbon group having 9 or more carbon atoms is 100 mol %. In addition, in M-HEC-12, the molar average carbon number of $R^1$ of the hydrophobic group is 16, and the proportion of the hydrocarbon group having 9 or more carbon atoms is 100 mol %.

Examples 1 TO 22 and Comparative Examples 1 to 8

[Evaluation of Cleaning Performance and Texture]
(1) Treatment Method of Fabric for Evaluation
(1-1) Pretreatment of Cotton Fabric 24 sheets of cotton towels (TW-220, manufactured by Takei Towel Co., Ltd., cotton: 100%) were subjected to the following laundry operation and then dried in an environment at 23° C. and 45% RH for 24 hours.

The laundry operation was composed of a laundry operation (1) and a laundry operation (2).

In the laundry operation (1), cleaning was continuously performed two times through a standard course of a fully automatic washing machine (NA-F702P, manufactured by Matsushita Electric Industrial Co., Ltd.) by using a surfactant. In the laundry operation (1), 4.7 g of EMULGEN 108 (a nonionic surfactant, manufactured by Kao Corporation) was used as the surfactant during cleaning of this standard course. In addition, the condition of the aforementioned standard course adopted in the laundry operation (1) is as follows. Quantity of water: 47 L, water temperature: 20° C., cleaning time: 9 minutes, water-saving rinsing: 2 times, and dehydration: 3 minutes In addition, in the laundry operation (2), the laundry operation was repeatedly performed three times under the same condition as that in the aforementioned laundry operation (1), except that the surfactant was not used during the cleaning of the aforementioned standard course.

In this pretreatment, a series of laundry operation composed of the laundry operation (1) and the laundry operation (2) was performed under these conditions.

(1-2) Preparation of Fabric for Evaluation

In a washing machine (N-BK2, manufactured by Matsushita Electric Works, Ltd.), 3,200 mL of water having a hardness of 4° dH was poured, and 2.13 g of each of compositions shown in Tables 2 and 3 was charged, followed by stirring for 3 minutes. Thereafter, one sheet of cotton fabric obtained in the above (1-1) and five sheets of polyester fabrics (manufactured by Senshoku Shizai K.K., Tanigashira Shoten, polyester: 100%) which had been cut in a square of 6 cm×6 cm were charged and treated for 5 minutes. Thereafter, the resulting fabrics were dried with a twin tub washing machine (PS-H35L, manufactured by Hitachi, Ltd.) for 1 minute and then naturally dried for 12 hours.

(2) Evaluation of Cleaning Performance
[Preparation of Dirty Fabric]

0.1 mL of the following model sebum artificial dirty liquid was uniformly applied on the polyester fabrics (36 cm²) prepared in the above (1), the applied polyester fabrics were allowed to stand for drying at room temperature for 3 hours.

<Model Sebum Artificial Dirty Liquid>
Oleic acid: 35% by mass
Triolein: 30% by mass
Squalene: 10% by mass
2-Ethylhexyl palmitate: 25% by mass To the foregoing mixture, 0.02% by mass Sudan III was mixed to prepare the model sebum artificial dirty liquid.

[Cleaning Test]

A one-liter beaker was charged with 0.6 g of an aqueous solution having a total surfactant concentration of 20% by mass (10% by mass of polyoxyethylene(2) lauryl ether sodium sulfate and 10% by mass of polyoxyethylene(10) lauryl ether), 599.4 g of water having a hardness of 4° dH, and the five sheets of dirty fabrics prepared in the above (2), a propeller for stirring was connected to a motor (Three-One Motor, manufactured by Shinto Scientific Co., Ltd.) set such that the rotation direction was changed every 10 seconds, and the inside of the beaker was stirred and cleaned at 200 r/min for 5 minutes. Subsequently, the cleaned polyester fabrics were dehydrated for one minute by using the aforementioned twin tub washing machine. Thereafter, the polyester fabrics were charged in a one-liter beaker in which 600 g of water having a hardness of 4° dH had been charged, and stirring was performed under the same condition as mentioned above. Subsequently, the polyester fabrics were dehydrated for one minute by using the aforementioned twin tub washing machine and then naturally dried for 12 hours.

[Evaluation of Cleaning Performance]

Reflectances of a polyester raw fabric before contamination and polyester fabrics before and after cleaning at 460 nm were measured with a spectrophotometer (SE-2000, manufactured by Nippon Denshoku Industries Co., Ltd.), and the cleaning rate (%) was determined according to the following equation.

Cleaning rate(%)=100×[{(Reflectance after cleaning)−(Reflectance before cleaning)}/{(Reflectance of raw fabric)−(Reflectance before cleaning)}]

(3) Evaluation of Texture

The cotton fabric obtained in the above (1-2) was evaluated for texture (softness). Five expert panelists performed the evaluation according to 4 grades of the following 0 to 3 points while making the cotton towels obtained in the above (1-1) as a standard, and a total point thereof was adopted.

Evaluation Standard
0 point: Harder than the standard
1 point: Equal to the standard
2 points: Slightly softer than the standard
3 points: Softer than the standard <Formulation of Composition>

Compositions of the present invention were prepared according to the blending formulations shown in Tables 2 and 3. The respective blending amounts are those expressed in terms of a solids content (active component amounts). Deionized water was blended such that the total of the composition was 100 parts by mass. The respective components used are as follows.

- M-HEC-1 to M-HEC-12 (modified hydroxyalkyl celluloses): M-HEC-1 to M-HEC-12 synthesized in the aforementioned Synthesis Examples 1 to 12
- HEC: "Natrosol 250GR", manufactured by Ashland
- A-HEC: Produced in the same manner as in Synthesis Example 2, except for changing the hydrophobizing agent to 11.4 g of 1,2-epoxytetradecane (manufactured by Wako Pure Chemical Industries, Ltd.) and not performing the reaction with the cationizing agent.
- C-HEC: Produced in the same manner as in Synthesis Example 2, except for changing the amount of GMAC to 7.8 g and not performing the reaction with the hydrophobizing agent.
- TETRANYL (cationic surfactant): A fatty acid formed of palm oil as a raw material and triethanolamine are subjected to a dehydration condensation reaction in a reaction molar ratio of 1.65/1 (fatty acid/triethanolamine), to obtain a condensate composed of an N,N-dialkanoyloxyethyl-N-hydroxyethylamine as a main component. Subsequently, this condensate is subjected to quaternization with 0.95 equivalents of dimethyl sulfate, to obtain the cationic surfactant (TETRANYL).
- DMAC (cationic surfactant): Distearyldimethylammonium chloride, "QUARTAMIN D86P", manufactured by Kao Corporation

TABLE 2

| | | Example 1 | Example 2 | Example 3 | Example 4 | Example 5 | Example 6 | Example 7 | Example 8 | Example 9 |
|---|---|---|---|---|---|---|---|---|---|---|
| (A) | M-HEC-1 | 0.500 | | | | | | | | |
| | M-HEC-2 | | 0.500 | | | | | | | |
| | M-HEC-3 | | | 0.500 | | | | | | |
| | M-HEC-4 | | | | 0.500 | | | | | |
| | M-HEC-5 | | | | | 0.500 | | | | |
| | M-HEC-6 | | | | | | 0.500 | | | |
| | M-HEC-7 | | | | | | | 0.500 | | |
| | M-HEC-8 | | | | | | | | 0.500 | |
| | M-HEC-9 | | | | | | | | | 0.500 |
| | M-HEC-10 | | | | | | | | | |
| | M-HEC-11 | | | | | | | | | |
| | M-HEC-12 | | | | | | | | | |
| (A') | HEC | | | | | | | | | |
| | C-HEC | | | | | | | | | |
| | A-HEC | | | | | | | | | |
| (B) | TETRANYL | 5.00 | 5.00 | 5.00 | 5.00 | 5.00 | 5.00 | 5.00 | 5.00 | 5.00 |
| | (B)/(A) or (B)/(A') | 10 | 10 | 10 | 10 | 10 | 10 | 10 | 10 | 10 |
| Evaluation | Cleaning rate (%) | 64 | 69 | 55 | 58 | 63 | 65 | 60 | 57 | 60 |
| | Texture | 15 | 14 | 15 | 15 | 15 | 15 | 15 | 15 | 15 |

| | | Example 10 | Example 11 | Example 12 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|
| (A) | M-HEC-1 | | | | | 5.50 | 0.500 | | | |
| | M-HEC-2 | | | | | | | | | |
| | M-HEC-3 | | | | | | | | | |
| | M-HEC-4 | | | | | | | | | |
| | M-HEC-5 | | | | | | | | | |
| | M-HEC-6 | | | | | | | | | |
| | M-HEC-7 | | | | | | | | | |
| | M-HEC-8 | | | | | | | | | |
| | M-HEC-9 | | | | | | | | | |
| | M-HEC-10 | 0.500 | | | | | | | | |
| | M-HEC-11 | | 0.500 | | | | | | | |
| | M-HEC-12 | | | 0.500 | | | | | | |
| (A') | HEC | | | | | | | 0.500 | | |
| | C-HEC | | | | | | | | 0.500 | |
| | A-HEC | | | | | | | | | 0.500 |
| (B) | TETRANYL | 5.00 | 5.00 | 5.00 | 5.00 | 5.00 | | | 5.00 | 5.00 |
| | (B)/(A) or (B)/(A') | 10 | 10 | 10 | — | 10 | 0 | 0 | 10 | 10 |
| Evaluation | Cleaning rate (%) | 60 | 68 | 44 | 25 | 30 | 80 | 63 | 40 | 42 |
| | Texture | 15 | 15 | 13 | 14 | 14 | 6 | 5 | 15 | 15 |

TABLE 3

| | | Example | | | | | | | | | | | Comparative Example | |
|---|---|---|---|---|---|---|---|---|---|---|---|---|---|---|
| | | 1 | 13 | 14 | 15 | 16 | 17 | 18 | 19 | 20 | 21 | 22 | 7 | 8 |
| (A) | M-HEC-1 | 0.500 | 0.300 | 0.100 | 1.00 | 1.50 | 2.00 | 0.500 | 0.500 | 0.500 | 0.500 | 0.500 | 2.75 | 0.500 |
| (B) | TETRANYL DMAC | 5.00 | 5.20 | 5.40 | 4.50 | 4.00 | 3.50 | 4.00 | 3.00 | 2.00 | 1.00 | 5.00 | 2.75 | 0.500 |
| | (B)/(A) | 10 | 17 | 54 | 4.5 | 2.7 | 1.8 | 8.0 | 6.0 | 4.0 | 2.0 | 10 | 1.0 | 1.0 |
| Evaluation | Cleaning rate (%) | 64 | 55 | 45 | 71 | 76 | 79 | 62 | 65 | 68 | 67 | 59 | 81 | 65 |
| | Texture | 15 | 14 | 15 | 13 | 14 | 15 | 14 | 14 | 14 | 9 | 13 | 8 | 8 |

As is evident from Tables 2 and 3, it has become clear that according to the treatment with the composition of the present invention, the performance of cleaning a dirty is improved.

On the other hand, according to the hydroxyalkyl cellulose, the hydroxyalkyl cellulose having only a cationic group introduced thereinto (C-HEC), and the hydroxyalkyl cellulose having only a hydrophobic group introduced thereinto (A-HEC), a sufficient cleaning performance was not obtained.

In the case of jointly using the modified hydroxyalkyl cellulose and the cationic surfactant in a specified proportion, the excellent texture was obtained together with the high cleaning performance, and furthermore, the excellent texture was obtained as compared with the case of using alone the cationic surfactant.

INDUSTRIAL APPLICABILITY

In accordance with the present invention, by treating an object, such as clothing, easiness of dirt removal during cleaning can be improved. The composition of the present invention is suitable for use as a surface treatment agent and more suitable as a finishing agent for fiber product. It is able to impart extremely excellent effects, such as improvement in cleaning performance and improvement in texture, with respect to clothing or the like treated with such a composition.

The invention claimed is:

1. A composition, comprising:
   a modified hydroxyalkyl cellulose (A); and
   a cationic surfactant (B),
   wherein:
   the modified hydroxyalkyl cellulose (A) has a cationic group and a hydrophobic group represented by a formula (1), each of which is bound to a group resulting from eliminating a hydrogen atom from a hydroxy group of a hydroxyalkyl cellulose;
   a degree of substitution of the hydroxyalkyl group in the hydroxyalkyl cellulose is 0.1 or more and 3 or less; and
   a content of the cationic surfactant (B) is more than 1 part by mass and 1,500 parts by mass or less relative to 1 part by mass of the modified hydroxyalkyl cellulose (A):

wherein:
   Z represents a single bond or a hydrocarbon group having an oxygen atom;
   $R^1$ represents a hydrocarbon group having 2 or more and 12 or less carbon atoms;
   * in formula (1) represents a binding position to a group resulting from eliminating a hydrogen atom from a hydroxy group of the hydroxyalkyl cellulose;
   a degree of substitution of the hydrophobic group represented by the formula (1) in the modified hydroxyalkyl cellulose (A) is 0.0001 or more and 1 or less, and
   the hydrophobic group represented by the formula (1) is any hydrophobic group represented by formulae (1-1), (1-1'), (1-2), and (1-2');

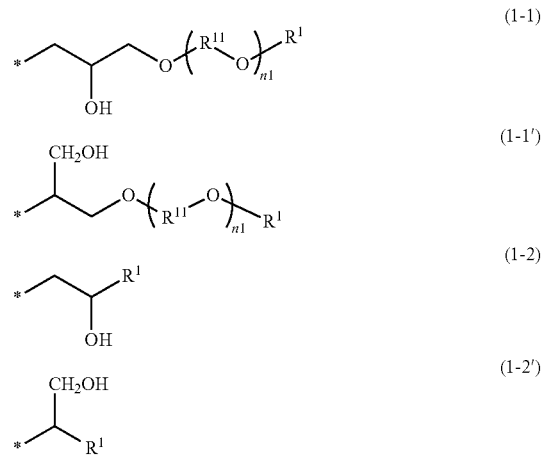

wherein:
   $R^{11}$'s each independently represent an alkylene group having 2 to 4 carbon atoms;
   $R^1$ in formulae (1-1), (1-1'), (1-2), and (1-2') is synonymous with $R^1$ in the formula (1);
   n1 represents an addition molar number of —$R^{11}$—O—, and n1 is an integer of 0 or more and 30 or less: and
   * in formulae (1-1), (1-1'), (1-2), and (1-2') is synonymous with * in the formula (1).

2. The composition according to claim 1, wherein a degree of substitution of the cationic group in the modified hydroxyalkyl cellulose (A) is 0.001 or more and 1 or less.

3. The composition according to claim 1, wherein a degree of substitution of the hydrophobic group represented by the formula (1) in the modified hydroxyalkyl cellulose (A) is 0.015 or more and 0.05 or less.

4. The composition according to claim 1, wherein a weight average molecular weight of the hydroxyalkyl cellulose is 1,000 or more and 3,000,000 or less.

5. The composition according to claim 1, wherein the cationic group which the modified hydroxyalkyl cellulose (A) has comprises a quaternary ammonium cation and is represented by a formula (2-1) or a formula (2-2):

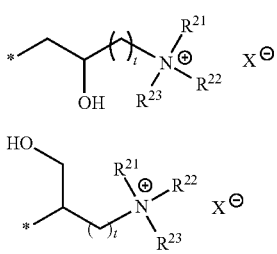

(2-1)

(2-2)

wherein:
R$^{21}$ to R$^{23}$ each independently represent a hydrocarbon group having 1 or more and 4 or less carbon atoms;
X" represents an anion;
"t" represents an integer of 0 or more and 3 or less; and
* represents a binding position to a group resulting from eliminating a hydrogen atom from a hydroxy group of the hydroxyalkyl cellulose.

6. The composition according to claim 1, wherein a content of the modified hydroxyalkyl cellulose (A) is 0.00001% by mass or more and 10% by mass or less.

7. The composition according to claim 1, wherein a content of the cationic surfactant (B) is 0.001% by mass or more and 50% by mass or less.

8. The composition according to claim 1, wherein the cationic surfactant (B) is a quaternary ammonium salt.

9. A surface treatment agent, comprising the composition according to claim 1.

10. A finishing agent, comprising the composition according to claim 1.

11. A surface treatment method, the method comprising:
bringing the composition according to claim 1 into contact with an article.

12. A surface treatment method of fiber product, the method comprising:
bringing the composition according to claim 1 into contact with a fiber product.

13. The composition according to claim 1, wherein the hydrophobic group represented by the formula (1) is the hydrophobic group represented by formulae (1-1).

14. The composition according to claim 1, wherein the hydrophobic group represented by the formula (1) is the hydrophobic group represented by formulae (1-1').

15. The composition according to claim 1, wherein the hydrophobic group represented by the formula (1) is the hydrophobic group represented by formulae (1-2).

16. The composition according to claim 1, wherein the hydrophobic group represented by the formula (1) is the hydrophobic group represented by formulae (1-2').

17. The composition according to claim 5, wherein the hydrophobic group represented by the formula (1) is the hydrophobic group represented by formulae (1-1).

18. The composition according to claim 5, wherein the hydrophobic group represented by the formula (1) is the hydrophobic group represented by formulae (1-1').

19. The composition according to claim 5, wherein the hydrophobic group represented by the formula (1) is the hydrophobic group represented by formulae (1-2).

20. The composition according to claim 5, wherein the hydrophobic group represented by the formula (1) is the hydrophobic group represented by formulae (1-2').

* * * * *